(12) United States Patent
Herold et al.

(10) Patent No.: US 7,553,466 B2
(45) Date of Patent: Jun. 30, 2009

(54) METHOD FOR PRODUCING HIGHLY PURE, GRANULAR SILICON IN A FLUIDISED BED

(75) Inventors: Heiko Herold, Neuss (DE); H. Günter Holdenried, Leichlingen (DE); Leslaw Mleczko, Bochum (DE); Matthias Pfaffelhuber, League City, TX (US); Karl-Theodor König, Laufenberg (DE)

(73) Assignee: Solarworld Aktiengesellschaft, Bonn (DE)

( * ) Notice: Subject to any disclaimer, the term of this patent is extended or adjusted under 35 U.S.C. 154(b) by 1107 days.

(21) Appl. No.: 10/478,608

(22) PCT Filed: Apr. 10, 2002

(86) PCT No.: PCT/EP02/03973

§ 371 (c)(1),
(2), (4) Date: Mar. 31, 2004

(87) PCT Pub. No.: WO02/094714

PCT Pub. Date: Nov. 28, 2002

(65) Prior Publication Data
US 2004/0151652 A1 Aug. 5, 2004

(30) Foreign Application Priority Data
May 22, 2001 (DE) ................. 101 24 848

(51) Int. Cl.
*C01B 33/02* (2006.01)
(52) U.S. Cl. ............ 423/349; 423/350; 423/335
(58) Field of Classification Search ............. None
See application file for complete search history.

(56) References Cited

U.S. PATENT DOCUMENTS

| 3,012,861 | A | | 12/1961 | Ling et al. |
| 3,012,862 | A | | 12/1961 | Bertrand et al. |
| 4,314,525 | A | * | 2/1982 | Hsu et al. .............. 118/716 |
| 4,818,495 | A | * | 4/1989 | Iya .................. 422/145 |
| 4,857,173 | A | * | 8/1989 | Belk .................. 209/2 |
| 4,946,654 | A | | 8/1990 | Uhlemann et al. |

FOREIGN PATENT DOCUMENTS

| EP | 0 163 836 | 12/1985 |
| JP | 01065010 | 3/1989 |
| JP | 6-100312 | 4/1994 |
| JP | 06191817 | 7/1994 |

* cited by examiner

*Primary Examiner*—Melvin C Mayes
*Assistant Examiner*—Smita Patel
(74) *Attorney, Agent, or Firm*—McGlew and Tuttle, P.C.

(57) ABSTRACT

The present invention relates to a method for producing highly pure, granular silicon with a narrow particle-size distribution by decomposing silanes or halosilanes in a fluidised bed and epitaxially growing silicon on silicon seed particles, which method is characterised in that the gas containing silicon is supplied to the reaction chamber in an upward flow and the contents of the fluidised bed are separated in a continuous or discontinuous manner, whereby a particle stream from the fluidised bed is supplied to a separator mounted outside the fluidised bed, particles of the desired size are separated and undersized particles are returned to the fluidised bed. The invention also relates to a device and the use thereof for carrying out said method.

19 Claims, 2 Drawing Sheets

METHOD FOR PRODUCING HIGHLY PURE, GRANULAR SILICON IN A FLUIDISED BED

Figure 1:
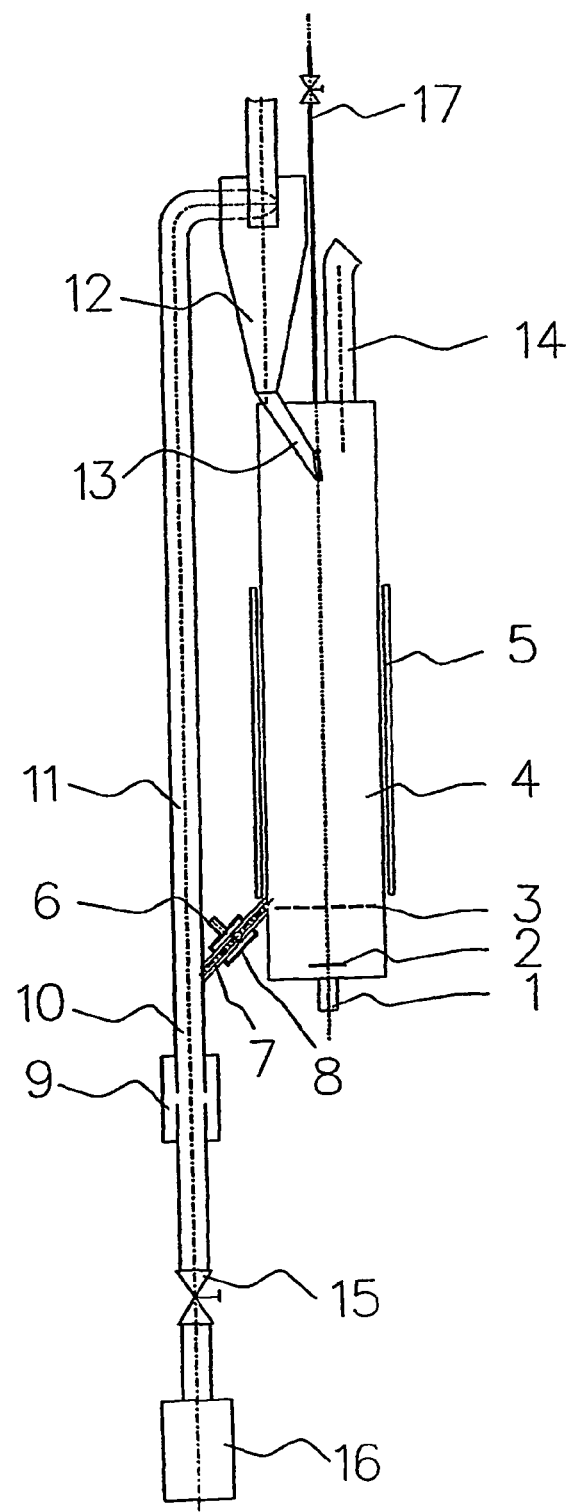

The invention relates to a method for producing highly pure, granular silicon with a narrow particle-size distribution by decomposing silicic gases in a moving-bed or fluidised-bed reactor. Furthermore the invention relates to a device and the use thereof for carrying out said method.

Silicic gases as referred to herein are gases containing silicon compounds or mixtures of silicon compounds which under the conditions according to the invention can be decomposed in the gaseous phase depositing silicon.

The growing demand for high-tech electronics and the efforts for reducing the consumption of fossil fuels by opening up alternative energy sources like solar energy has not only led to an increased demand for semiconductor materials but particularly so to a dramatic increase of the purity requirements on such substances.

Due to the good availability of the starting compounds as well as its excellent semiconductor qualities, the production of highly pure silicon for the photovoltaic area and electronics is in the focus of interest here.

A common method is the thermal decomposition of silanes or halosilanes, preferably carried out in a moving-bed or fluidised-bed reactor.

Methods wherein pure, elemental silicon is epitaxially growing on silicon seed particles by thermally decomposing silanes or halosilanes in a fluidised bed are known for example from U.S. Pat. No. 3,012,861 and U.S. Pat. No. 3,012,862.

In a fluidised-bed reactor, an initially stationary bed of solid particles, in this case silicon seed particles, is fluidised by an upward flow of gas, i.e. said bed is turned into a liquid-like state once its volume flow exceeds a certain limit depending, among other things, on the density and the diameter of the particles. This limit is called loosening velocity. The advantages of such fluidisation are, for example, the intensive mixing of particles and the large contact surface between the solid and gaseous phases.

Such silicon-containing educts used for thermal decomposition are silicon-hydrogen compounds, i.e. silanes, or halosilanes, which may be diluted by argon, helium, nitrogen or hydrogen.

The thermal decomposition of silanes is advantageous because unlike halosilanes, silanes do not require additional reducing agents and no corrosive gases like halogen hydrogens arise as by-products. In addition, the decomposition of silane occurs already in the range from 500° C., whereas most halosilanes require at least 800° C., i.e. much more energy is required.

Many applications in the photovoltaic area or in semiconductor technology require highly pure, granular silicon with a narrow particle-size distribution.

In this context, "highly pure" means a silicon content of at least 99.99999%. The required average particle sizes are generally between 50 and 5000 μm. A narrow particle-size distribution of the silicon particles has the advantage that the further processing of such silicon, which is mainly done by remelting, requires less energy. U.S. Pat. No. 3,012,862 describes a method for producing pure silicon by decomposing halosilanes in the presence of the reducing agent in a fluidised bed. During the process of epitaxial growth, particles are formed which due to their size are not fluidised any more, but deposit on the bottom of the bed in the reactor. This process is called segregation. Through a side outlet these large particles are conducted to an external separation and, if necessary, occurring fine material is returned into the reaction zone. Such a method holds a considerable risk as a segregation on the bottom of the reactor can lead first to an agglomeration of the segregated bed contents, then during the further reaction to an agglomeration of the complete bed and finally to a termination of the process.

In U.S. Pat. No. 4,818,495, a construction is described wherein the gas required for fluidisation (fluidising gas) is blown into the reactor through a conical bottom, centrically arranged in which is a separation zone into which an upward gas stream (separation gas) is blown. JP-A 06100312 depicts another such central outward transfer. When using a central separation outlet with an upward gas feeding direction, the separation gas is introduced into the reactor at a much higher velocity than the fluidising gas. Because of the high velocity, the central flow of the separation gas is dominating and immediately attracts the gas bubbles forming of the fluidising gas in the reactor towards this central flow. There may occur a decomposition of silane or halosilanes inside the gas bubbles, however, the silicon forming there occurs in the form of very fine particles which do not bond to the surface of the seed particles. This process is called homogenous pyrolysis wherein generally particles of sizes below 50 μm are formed. As the settling speed of such fine particles is very low they are carried out by the fluidising or separation gas thus causing a loss which dramatically reduces the yield of silicon deposited on seed particles (by so-called heterogeneous pyrolysis). When working without separation gas, produce with a very broad particle-size distribution leaves the reactor through the central outlet. This means that in part particles are produced whose size exceeds the desired size by far. Furthermore some seed particles remain without any deposit.

Therefore there was a need to find a method wherein a high yield of highly pure, granular silicon with a narrow particle-size distribution suitable for use in the photovoltaic area and in semi-conductor technology can be obtained by decomposing silicic gases in a moving-bed or fluidised-bed reactor.

The invention relates therefore to a method for producing highly pure, granular silicon with a narrow particle-size distribution by decomposing silanes or halosilanes in a fluidised bed and epitaxially growing silicon on silicon seed particles, which method is characterised in that the gas containing silicon is supplied to the reaction chamber in an upward flow and the contents of the thus fluidised bed are separated in a continuous or discontinuous manner, whereby a particle stream from the fluidised bed is supplied to a separator mounted outside the fluidised bed, particles of the desired size are separated and undersized particles are returned to the fluidised bed. The invention also relates to a device and the use thereof for carrying out said method.

The special advantage of this method consists in that the fluidised contents of the bed has a narrow particle-size distribution, which reduces the risk of segregation and defluidisation. Another advantage is that the contents of the fluidised bed is finer because the particles of the desired size are carried out which encourages the formation of smaller gas bubbles. Smaller gas bubbles lead to a reduction of the unwanted dust formation thus enabling a high yield of silicon epitaxilly grown on seed particles.

The method according to the invention will now be described in more detail with reference to the exemplary embodiment depicted in FIGS. 1 and 2. This serves merely to enable a better understanding of the invention without limiting the underlying principles of the invention to any extent.

FIG. 1 shows the reactor with the gas supply (1), the braking plate (2), the apertured bottom (3), the reaction chamber (4) with the heating (5). Outside the reaction chamber, there is the seal gas supply (6) towards outlet (7) surrounded by the ring chamber (8). The separation gas supply (9) leads towards the separation tube (10) with the subsequent fine material feedback (11) discharging into the fine material cyclone (12). Below the cyclone is the fine material flap valve (13). The dust outlet (14) is located at the upper end of the reactor chamber. The bottom end of the separation tube (10) is connected to the finished product discharge valve (15) of the collecting container (16). On top of the reaction chamber (4), the seed particle pipe (17) is arranged.

Figure 2:
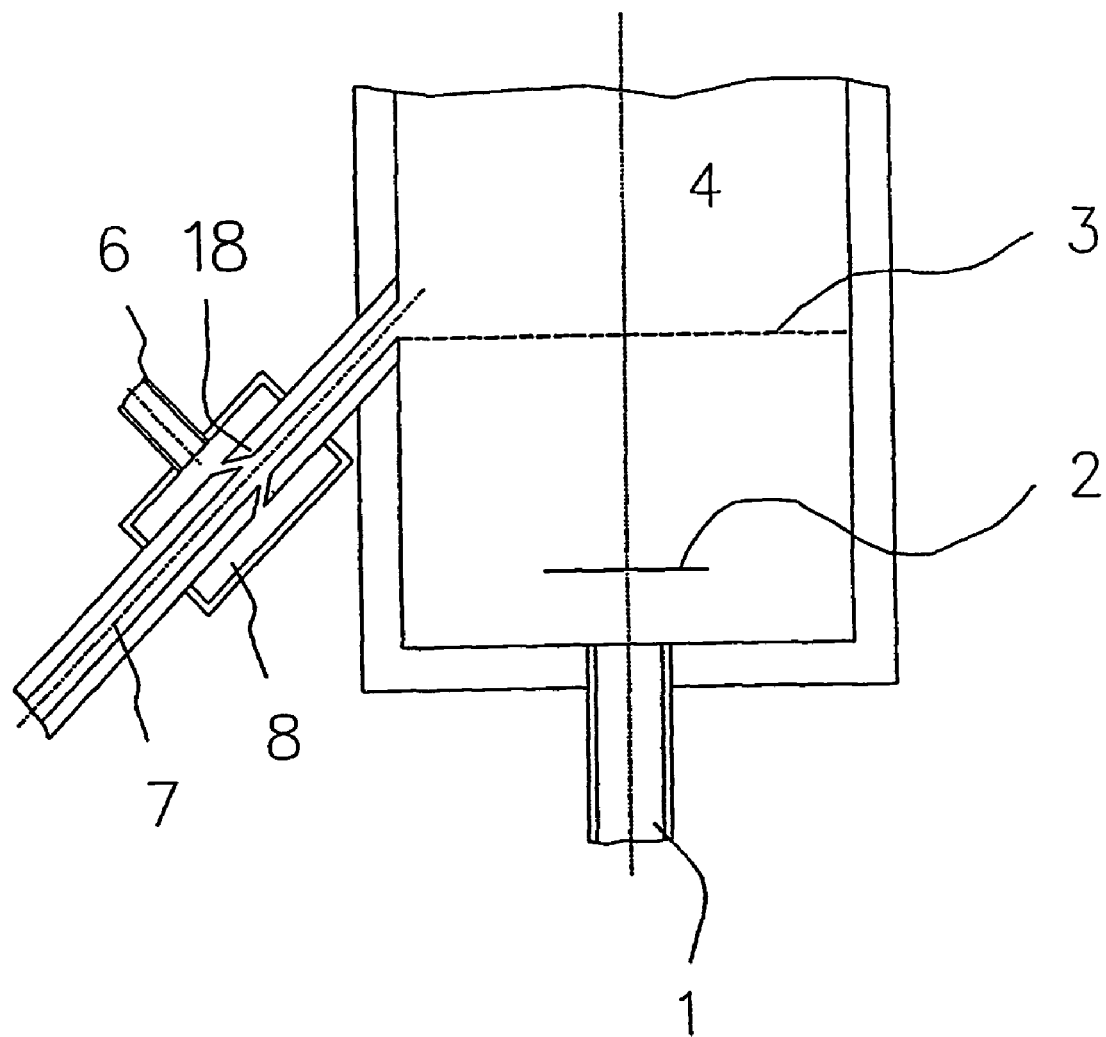

According to FIG. 2, the downward outlet (7) is located above the apertured bottom (3). The seal gas supply (6) leads to the ring chamber (8) with the propulsion jet bore holes (18), which chamber surrounds the outlet (7).

According to FIG. 1, silicic gas is led to the reactor by means of the gas supply (1).

Besides silane $SiH_4$ and its higher homologues, as for example disilane $Si_2H_6$, trisilane $Si_3H_8$, tetrasilane $Si_4H_{10}$ and hexasilane $Si_6H_{14}$, halosilanes of the general formula $SiH_mHal_{(4-m)}$ can be used, wherein m can be an integer from zero to three and Hal can be chlorine, bromine or iodine. A mixture of such silicon compounds is also suitable for the method according to the invention. Silicon compounds which are not gaseous at room temperature can be thermally transferred into the gaseous phase for example.

Silane $SiH_4$, disilane $Si_2H_6$, trisilane $Si_3H_8$, tetrasilane $Si_4H_{10}$ and hexasilane $Si_6H_{14}$ are preferred, silane $SiH_4$ is particularly preferred.

The total volume percentage of silanes or halosilanes in the introduced gas can be for example between 1% and 100%, 5 to 20 volume percent are preferred.

Furthermore the silicic gas may contain for example noble gases, e.g. argon or helium, nitrogen, other gases rendered inert under the reaction conditions or hydrogen or any mixture of such gases. Nitrogen and hydrogen are preferred, hydrogen is particularly preferred.

When using halosilanes, it must be ensured that per mol equivalent halogen at least one mol equivalent hydrogen is provided in the silicic gas. Such hydrogen equivalents can originate for example from silanes, monohalosilanes, dihalosilanes or trihalosilanes or elementary hydrogen.

The entering impulse of the silicic gas flow is refracted by the subsequent braking plate (2).

This is a common measure to ensure a steady penetration of the silicic gas flow serving as fluidising gas through the apertured bottom (3). The method according to the invention can also be carried out without such a braking plate. Other devices enabling the refraction of the impulse of the entering gas flow, e.g. deflection pipes or nozzles or another apertured bottom, are also possible.

The stream-in velocity of the introduced silicic gas should be between once to tenfold the loosening velocity required for fluidising the bed, one and a half times to seven times the speed is preferred.

The temperature of the introduced silicic gas is preferably below the temperature at which the silicic gas gets not yet decomposed. In the case of silane this is a temperature of about 300° C. The minimum introduction temperature is to be chosen such that it is at least equivalent to the boiling point of the compound based on the used partial pressure of the silicic gas, however below the respective range of decomposition.

The pressure loss of the apertured bottom (3) completing the reaction zone at its bottom end can be adjusted in a way ensuring a steady feed stream into the reaction zone of the reactor (4).

The pressure at which the method according to the invention can be carried out is uncritical. It is preferred, however, to work at pressures ranging from 50 to 50000 mbar. 100 to 10000 mbar are preferred, 200 to 6000 mbar are particularly preferred. All indicated pressure values are absolute values referring to the pressure prevailing behind the fluidized bed as seen in flow direction of the introduced gas.

The temperature of the apertured bottom should be selected such that it is below the decomposition range of the used silicon compounds during the process of epitaxial growth. Such range for silane is above approx. 300° C.

Preferably the temperature of the apertured bottom is between 20 and 300° C., particularly preferred between 200 and 250° C.

Higher temperatures can lead to silicon depositing in the apertured bottom, thus obstructing the apertures and finally to a termination of the process. The apertured bottom can be provided with several apertures ensuring a homogeneous fluidisation of the above bed by the flow of silicic gas entering the reaction zone of the reactor.

The reactor (4) is surrounded by a heating, e.g. a resistance heating (5). The heating heats up the bed such that the temperature inside the reactor is above the decomposition range of the silicic gas, however below the melting point of silicon (1414° C.). The temperature of the reactor wall is for example 2 to 200° C. higher than the temperature in the interior of the reactor, preferably between 5 and 80° C. higher.

When using silane, the advantageous temperature range in the interior of the reactor is between 500 and 1400° C., preferably between 600 to 1000° C. and particularly preferred between 620 to 800° C.

A part of the fluidised bed contents is introduced through the side outlet (7) into the separator (10), which is provided with separation gas by means of the separation gas supply (9).

Also several outlets can be provided for example. The outlet or the outlets can also be integrated for example in the apertured bottom (3).

The separator can be for example a vertical upflow separator or a zigzag separator. However, in all embodiments the separator should be located outside the fluidised bed.

The separation gas can be a gas rendered inert under the said reaction conditions, for example a noble gas, e.g. argon or helium, nitrogen, hydrogen or any mixture thereof. Nitrogen and hydrogen are preferred, hydrogen is particularly preferred.

The fines carried by the separation gas are introduced through the ascending pipe (11) into a cyclone (12), where it is deposited.

Other devices for the separation of fine material, such as filters, are also suitable for the method according to the invention.

The feedback into the reactor is carried out by means of a fine material feedback pipeline provided with a flap valve (13) which opens automatically if a sufficiently high column of fines has accumulated in the fine material feedback pipeline.

It is also possible to collect the fine material in a collecting container or to return it from the cyclone into the bed. Feedback of the fine material into the reaction zone is preferred.

Fine material is carried out of the reactor through the dust outlet (14).

Fresh seed particles can be introduced into the reaction zone through the seed particle pipe (17).

The seed particle pipe can also be arranged laterally.

Silicon particles in the separator (10) which are not led to the cyclone (12) fall down, pass through the open stop valve (15) and are collected in a collecting container (16).

The desired particle size can be adjusted according to the usual procedures by controlling the flow of separation gas.

According to FIG. 2, silicon particles can leave the fluidised bed of the reactor (4) through the lateral downward outlet or connector element (7). The penetrating amount can be controlled by means of a control gas flow introduced into the outlet (7) through the supply (6) and the ring chamber (8) as well as the bore holes (18) that are inclined at an angle relative to the outlet direction. This allows also to stop the flow completely.

This enables separation to be carried out in a continuous or discontinuous manner, a continuous separation is preferred.

For separation, an outward transfer rate is preferred corresponding to 0.1 to 15 times, preferably 0.5 to 5 times and particularly preferred 1 to 3 times the bed contents.

Control gases can be for example gases rendered inert under the reaction conditions, for example noble gases, e.g. argon or helium, nitrogen, hydrogen or any mixture thereof. Nitrogen and hydrogen are preferred, hydrogen is particularly preferred.

The amount of penetrating particles can also be controlled for example by a mechanical control valve. The outlet (7) can also be integrated in the apertured bottom (3) for example.

In the course of the process based on the method according to the invention, particles with an average desired size between 50 and 5000 μm are obtained in the collecting container (16). The particle-size distribution of the product can be such that at least 90 weight percent of the separated particles have a grain size differing from the desired size by maximum 20%. A particle-size distribution where at least 90 weight percent of the separated particles have a grain size differing from the desired size by maximum 10% is preferred.

Preferably the method according to the invention is integrated into a complex method for producing silane and highly pure silicon.

It is particularly preferred that the method according to the invention be integrated into a method for producing silane and/or highly pure silicon comprising the following steps:

1. Trichlorosilane synthesis and subsequent isolation of the produced trichlorosilane by distillation and recycling of the unreacted silicon tetrachloride, and, if desired, the unreacted hydrogen;
2. Disproportionation of trichlorosilane to silane and silicon tetrachloride through the intermediate stages of dichlorosilane and monochlorosilane on basic catalysts, preferably catalysts containing amino groups, carried out in two apparatuses or in one, and recirculation of the produced silicon coming out as a high-boiling component into the first reaction area.
3. Further use of the silane of the purity achieved in the preceding step, or purification of the silane until the purity required for the intended purpose is achieved, preferably by distillation, particularly preferred by distillation under pressure.
4. Thermal decomposition of silane to obtain highly pure silicon and method according to the invention.

| Starting parameters: | |
|---|---|
| Reactor diameter | 52 mm |
| Mass of bed | 800 g |
| Diameter of seed particles | 200 μm |
| Reaction temperature | 650° C. |
| Pressure | 1 bar |
| Silane | 10 Vol % |
| Hydrogen | 90 Vol % |
| Gas velocity | 1.1 m/s |

COMPARATIVE EXAMPLE 1

(Reactor without a Separator)

A laboratory reactor is run in continuous operation. Permanently seed particles (200 μm) are introduced into the reactor and product particles are discharged. At a feeding rate of approx. 5 g/h, 113 g/h product particles with an average diameter of 740 μm is produced (silane conversion: 39.7%, dust selectivity: 14.3% $u/u_{mf}$:2.6). The particle sizes range from 200 to 1600 μm (90% passing).

EXAMPLE 2

(Reactor with Separator)

The reactor is run in continuous operation as specified in Example 1. At a seed particle feeding rate of approx. 0.8 g/h, approx. 105 g/h silicon is produced. With a separation grain of 1000 μm, an average diameter of bed particles of 770 μm and an average diameter of product particles of 1022 μm is obtained (at a reactor discharge rate of approx. 1300 g/h) (silane conversion: 41% dust selectivity: 14.4% $u/u_{mf}$:2.8).

The invention claimed is:

1. A method for producing highly pure, granular silicon with a narrow particle-size distribution by decomposing silanes or halosilanes in a fluidized bed and epitaxially growing silicon on silicon seed particles, the method comprising:
   providing a reaction chamber;
   providing a separator;
   providing a separation gas supply;
   providing a cyclone element;
   supplying a gas containing silicon is supplied to the to said reaction chamber in an upward flow;
   separating contents of the fluidized bed in a continuous manner, whereby a particle stream from the fluidized bed is supplied through at least one side outlet into said separator, said separator being mounted outside the fluidized bed, said separator being provided with separation gas via said separation gas supply, wherein particles of a desired size are separated via said separator, said separation gas including fine material after said particles are separated via said separator;
   controlling a flow of said particle stream through said at least one side outlet from said reaction chamber by a gas flow entering said at least one side outlet via another outlet, said gas flow being opposite to an outlet flow direction of said particle stream; and introducing said fine material in said separation gas into said cyclone element via an ascending pipe, said fine material being separated from said separation gas via said cyclone element.

2. A method according to claim 1, wherein after separation undersized particles are returned to the fluidized bed.

3. A method according to claim 1, wherein the desired size of the particles obtained by the separation process is between 50 and 5000 μm.

4. A method according to claim 1, wherein at least 90% of the particles obtained by the separation process have a grain size differing from the desired particle size by maximum 20%.

5. A method according to claim 1, wherein the flow of said gas containing silicon is introduced into the reactor chamber through a reactor bottom with more than one aperture.

6. A method according to claim 1, wherein a pressure prevailing in a portion of said reactor chamber located behind the fluidized bed as seen in flow direction of said gas containing silicon, is between 50 and 50000 mbar.

7. A method according to claim 1, wherein the separation is carried out in a vertical upflow separator.

8. A method according to claim 1, wherein the separation is carried out in a zigzag separator.

9. A method according to claim 1, wherein said fine material is separated from the separation gas in a dust separator.

10. A method according to claim 1, wherein said fine material is delivered to said reaction chamber.

11. A method according to claim 1, wherein said gas containing silicon contains silane $SiH_4$.

12. A method according to claim 1, wherein said gas containing silicon contains hydrogen.

13. A method according to claim 1, wherein silicon is produced, said silicon being used in the photovoltaic area.

14. A method according to claim 1, wherein silicon is produced, said silicon being used in the manufacture of electronic components.

15. A method for producing highly pure, granular silicon with a narrow particle-size distribution by decomposing silanes or halosilanes in a fluidized bed and epitaxially growing silicon on silicon seed particles, the method comprising:
   providing a reaction chamber, said reaction chamber having a bottom portion with at least one aperture;
   providing a separator including an ascending tube, said tube being connected to said reaction chamber;
   providing a separation gas supply;
   providing a connector element connected to said separation gas supply, said separator being connected to said reaction chamber via said connector element;
   providing a fluidized bed;
   supplying a flow of gas containing silicon to said reaction chamber, said flow of gas containing silicon being supplied in a longitudinal direction of said reaction chamber;
   separating contents of said gas containing silicon in said fluidized bed in a continuous manner such that a flow of particles from the fluidized bed is delivered to said separator via, said connector element, said separator being located at a position outside said fluidized bed, said separation gas supply supplying separation gas to said separator such that said flow of particles mixes with said separation gas, said separator separating said particles mixed in said separation gas such that said separation gas contains a desired size of particles;
   controlling said flow of said particles from said reaction chamber to said connector element based on a controlled feeding of a control gas supplied to said connector element; and
   providing a fine particle separation means for separating said desired size of particles from said separation gas;
   delivering said separation gas containing said desired size of particles to said fine particle separation means via said tube;
   separating said desired size of particles from said separation gas with said fine particle separation means after said separation containing said desired size of particles is delivered to said fine particle separation means to form separated desired sized particles.

16. A method according to claim 15, wherein said separated desired sized particles delivered to said fluidized bed.

17. A method according to claim 15, wherein said separated desired sized particles have a size between 50 and 5000 μm.

18. A method according to claim 15, wherein a pressure prevailing in a portion of said reactor chamber located behind the fluidized bed as seen in flow direction of said gas containing silicon, is between 50 and 50000 mbar.

19. A method for producing highly pure, granular silicon with a narrow particle-size distribution by decomposing silanes or halosilanes in a fluidized bed and epitaxially growing silicon on silicon seed particles, the method comprising:
   providing a reaction chamber, said reaction chamber having a side surface and a bottom portion with at least one aperture, said side surface having a reaction chamber opening;
   providing a separator including an ascending tube, said tube having a tube surface defining a tube opening, said separator being located at a spaced location from said reaction chamber;
   providing a separation gas supply;
   providing a connector element connected to said separation gas supply, said connector element being connected to said separator and said reaction chamber, wherein said reaction chamber opening is in communication with said tube opening;
   providing a fluidized bed;
   supplying a flow of gas containing silicon to said reaction chamber, said flow of gas containing silicon being supplied in a longitudinal direction of said reaction chamber;
   separating contents of said gas containing silicon in said fluidized bed in a continuous manner such that a flow of particles from the fluidized bed is delivered to said separator via said connector element, said separator being located at a position outside said fluidized bed, said separation gas supply supplying separation gas to said separator such that said flow of particles mixes with said separation gas, said separator separating said particles mixed in said separation gas such that said separation gas contains a desired size of particles;
   controlling said flow of said particles from said reaction chamber to said connector element based on a controlled feeding of a control gas supplied to said connector element; and
   providing a fine particle separation means for separating said desired size of particles from said separation gas;
   delivering said separation gas containing said desired size of particles to said fine particle separation means via said tube such that said desired size of particles are separated from said separation gas with said fine particle separation means.

* * * * *